(12) United States Patent
Asayag et al.

(10) Patent No.: US 10,185,582 B2
(45) Date of Patent: Jan. 22, 2019

(54) MONITORING THE PROGRESS OF THE PROCESSES EXECUTING IN A VIRTUALIZATION ENVIRONMENT

(71) Applicant: Red Hat Israel, Ltd., Raanana (IL)

(72) Inventors: Moti Asayag, Netanya (IL); Yair Zaslavsky, Netanya (IL)

(73) Assignee: Red Hat Israel, Ltd., Raanana (IL)

( * ) Notice: Subject to any disclaimer, the term of this patent is extended or adjusted under 35 U.S.C. 154(b) by 393 days.

(21) Appl. No.: 13/687,324

(22) Filed: Nov. 28, 2012

(65) Prior Publication Data

US 2014/0149982 A1 May 29, 2014

(51) Int. Cl.
| | | |
|---|---|---|
| *G06F 9/455* | (2018.01) | |
| *G06F 11/30* | (2006.01) | |
| *G06F 11/34* | (2006.01) | |
| *G06F 17/40* | (2006.01) | |

(52) U.S. Cl.
CPC ...... *G06F 9/45533* (2013.01); *G06F 9/45558* (2013.01); *G06F 11/3017* (2013.01); *G06F 11/3055* (2013.01); *G06F 11/3476* (2013.01); *G06F 17/40* (2013.01); *G06F 11/3006* (2013.01); *G06F 2201/815* (2013.01)

(58) Field of Classification Search
USPC ............ 718/1, 102, 104, 106; 711/114, 154; 709/223, 224; 358/1.15
See application file for complete search history.

(56) References Cited

U.S. PATENT DOCUMENTS

| | | | | |
|---|---|---|---|---|
| 6,694,345 | B1 * | 2/2004 | Brelsford | G06F 9/485 718/100 |
| 6,718,370 | B1 * | 4/2004 | Coffman | H04L 12/5693 709/212 |
| 6,957,363 | B2 * | 10/2005 | Spiegel | G06F 9/442 713/324 |
| 7,017,071 | B2 * | 3/2006 | Katayama et al. | 709/224 |
| 7,451,445 | B1 * | 11/2008 | Eppstein | G06F 9/4843 718/100 |
| 7,464,385 | B1 * | 12/2008 | Ozor et al. | 719/316 |
| 7,624,174 | B2 * | 11/2009 | Sanghvi | G06F 11/0754 709/224 |
| 7,823,021 | B2 * | 10/2010 | Abe | G06F 11/0715 714/2 |
| 8,037,317 | B2 * | 10/2011 | Kusudo | H04N 7/1675 455/3.02 |
| 8,255,913 | B2 * | 8/2012 | Arimilli et al. | 718/103 |
| 8,321,558 | B1 * | 11/2012 | Sirota et al. | 709/224 |
| 8,321,928 | B2 * | 11/2012 | Winneg | G06F 21/52 709/229 |
| 8,381,212 | B2 * | 2/2013 | Brelsford et al. | 718/100 |

(Continued)

FOREIGN PATENT DOCUMENTS

WO WO 2012018248 A1 * 2/2012 .......... G06F 9/5072

*Primary Examiner* — Abu Ghaffari
(74) *Attorney, Agent, or Firm* — Lowenstein Sandler LLP

(57) ABSTRACT

A host controller receives a request to perform an action in a virtual computing system. The host controller, creates a command to execute operations associated with the request and creates a job to monitor a progress of the operations of the command. As the command is executing the operations, the host controller receives an indication of the progress of the command execution, wherein the operations report the progress to the job each time an operation is completed.

18 Claims, 6 Drawing Sheets

(56) References Cited

U.S. PATENT DOCUMENTS

| | | | | |
|---|---|---|---|---|
| 8,635,629 B2* | 1/2014 | Fukui | | 719/318 |
| 9,164,824 B2* | 10/2015 | Harada | | G06F 11/0784 |
| 2002/0080389 A1* | 6/2002 | Carney | | G06F 3/1204 |
| | | | | 358/1.15 |
| 2004/0006403 A1* | 1/2004 | Bognanno | | G06Q 10/06 |
| | | | | 700/109 |
| 2004/0230625 A1* | 11/2004 | Baba | | G06F 11/2097 |
| 2004/0250249 A1* | 12/2004 | Fukunari et al. | | 718/100 |
| 2005/0015437 A1* | 1/2005 | Strait | | H04L 67/10 |
| | | | | 709/203 |
| 2005/0060704 A1* | 3/2005 | Bulson | | G06F 9/5077 |
| | | | | 718/1 |
| 2005/0088295 A1* | 4/2005 | Kondo | | G08B 13/19641 |
| | | | | 340/517 |
| 2006/0041660 A1* | 2/2006 | Bishop | | H04L 43/0811 |
| | | | | 709/224 |
| 2007/0220341 A1* | 9/2007 | Apostoloiu | | G06F 11/3664 |
| | | | | 714/33 |
| 2008/0005297 A1* | 1/2008 | Kjos | | G06F 12/1081 |
| | | | | 709/223 |
| 2008/0134178 A1* | 6/2008 | Fitzgerald | | G06F 9/45537 |
| | | | | 718/1 |
| 2008/0301296 A1* | 12/2008 | York | | 709/225 |
| 2009/0086262 A1* | 4/2009 | Suzuki | | 358/1.15 |
| 2009/0177731 A1* | 7/2009 | Zlotnick | | 709/203 |
| 2009/0199191 A1* | 8/2009 | Arimilli | | G06F 9/542 |
| | | | | 718/103 |
| 2009/0307660 A1* | 12/2009 | Srinivasan | | G06F 8/314 |
| | | | | 717/114 |
| 2011/0106928 A1* | 5/2011 | Gokurakuji | | H04L 67/06 |
| | | | | 709/223 |
| 2011/0126202 A1* | 5/2011 | Krauss | | G06F 9/485 |
| | | | | 718/102 |
| 2011/0131316 A1* | 6/2011 | Ferris et al. | | 709/224 |
| 2011/0179417 A1* | 7/2011 | Inakoshi | | 718/1 |
| 2011/0276396 A1* | 11/2011 | Rathod | | G06F 17/30867 |
| | | | | 705/14.49 |
| 2011/0296386 A1* | 12/2011 | Woollen | | G06F 8/70 |
| | | | | 717/124 |
| 2011/0314311 A1* | 12/2011 | Maeda | | G06F 1/3209 |
| | | | | 713/320 |
| 2012/0079096 A1* | 3/2012 | Cowan | | G06F 11/3006 |
| | | | | 709/224 |
| 2012/0124588 A1* | 5/2012 | Sinha | | G06F 9/5044 |
| | | | | 718/102 |
| 2012/0278478 A1* | 11/2012 | Fujino | | G06F 11/3006 |
| | | | | 709/224 |
| 2012/0296928 A1* | 11/2012 | Filliettaz, III | | G06Q 10/103 |
| | | | | 707/769 |
| 2013/0003115 A1* | 1/2013 | Uchikawa | | G06F 3/1207 |
| | | | | 358/1.15 |
| 2013/0024718 A1* | 1/2013 | Mewhinney | | G06F 11/1482 |
| | | | | 714/2 |
| 2013/0031353 A1* | 1/2013 | Noro | | G06F 1/3212 |
| | | | | 713/100 |
| 2014/0006612 A1* | 1/2014 | Fallon | | H04L 12/2602 |
| | | | | 709/224 |

* cited by examiner

MONITORING THE PROGRESS OF THE PROCESSES EXECUTING IN A VIRTUALIZATION ENVIRONMENT

TECHNICAL FIELD

This disclosure relates to the field of virtualization and, in particular, to self-monitored commands in a virtualization environment.

BACKGROUND

Virtualization allows multiplexing of the underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM) or a kernel-based hypervisor. The hypervisor emulates the underlying hardware of the host computer, making the use of the virtual machine transparent to the guest operating system and the user of the virtual machine.

Virtual machines can be provided by a centralized host that is coupled to multiple clients over a network. Each client can provide a virtual desktop environment indistinguishable from a physical desktop. A large organization with many different departments and multiple offices at various locations may have a system with thousands of virtual machines. Management of numerous virtual machines is a complex task that typically requires a large degree of system scalability. Certain virtual machine management systems may include a task manager that monitors the status of commands and processes being executed on the hosts running the hypervisors and tracks their progress. Not all systems include a task manager, however. In systems without a centralized task manager, monitoring the progress of commands and processes can be a complex and resource intensive undertaking.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Described herein is a method and system for self-monitoring commands. In one embodiment, a virtualized computing environment includes a host controller configured to monitor the progress of processes executing in the computing environment without the need for a centralized task manager. When the host controller receives a request to perform an action in the virtualized computing environment (e.g., a request to start a virtual machine), the host controller creates a command to handle the request. A command may represent a directive to a computer program in order to perform the action. The command may include a series of instructions, which when executed, cause a computer to perform the action. The host controller also creates a job to monitor the progress of the command execution. The job publishes an API, that when called records the status of intermediate steps of the command in a command status database. When the command is executed, each time a step of the command is started and/or completed, the instructions associated with the command call the API published by the job to report its status. This status is recorded in the command status database. Thus, each command's status is automatically reported during execution. There is no need for a centralized task process manager in the virtualized computing environment that would actively monitor executing processes (e.g., by periodically requesting status updates). This simplifies the host controller and saves computing resources for other uses.

Figure 1:
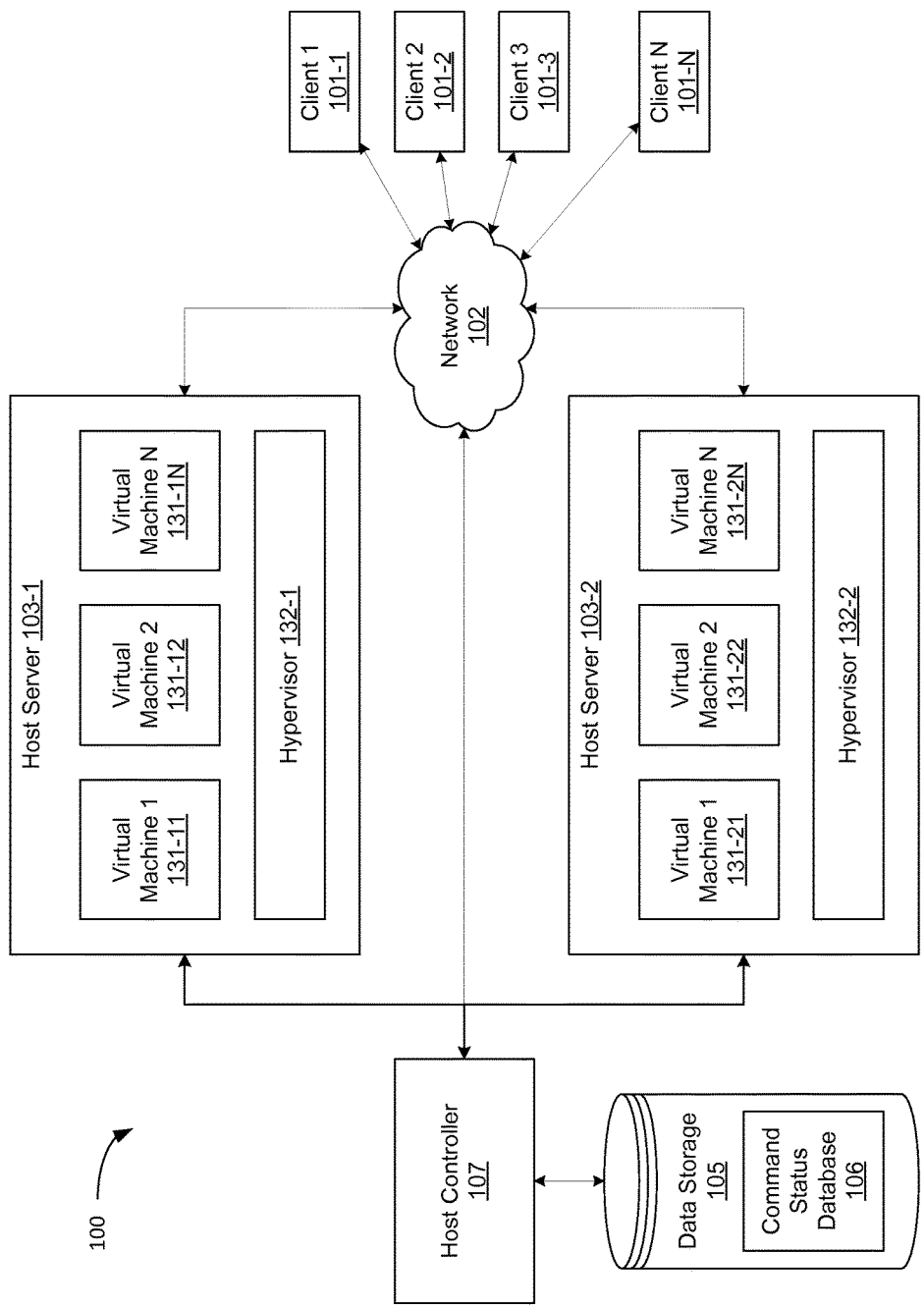
FIG. 1 is a block diagram illustrating an exemplary network architecture in which embodiment of the present invention may operate.

FIG. 1 illustrates an exemplary network architecture 100 in which embodiments of the present invention may operate. The network architecture 100 includes one or more host servers 103-1, 103-2 coupled to clients 101 over a network 102. The network 102 may be a private network (e.g., a local area network (LAN), wide area network (WAN), intranet, etc.) or a public network (e.g., the Internet). The host servers 103-1, 103-2 may also be coupled to a host controller 107 (via a network or directly). Host controller 107 may be an independent machine such as a server computer, a desktop computer, etc. Alternatively, the host controller 107 may be part of the host servers 103-1, 103-2.

In one embodiment, the clients 101-1, 101-N may include computing devices that have a wide range of processing capabilities. Some or all of the clients 101-1, 101-N may be thin clients, which serve as access terminals for users and depend primarily on the host servers 103-1, 103-2 for processing activities. For example, the clients 101-1, 101-N may be a desktop computer, laptop computer, cellular phone, personal digital assistant (PDA), etc. The clients 101-1, 101-N may run client applications such as a Web browser. The clients 101-1, 101-N may also run other client applications, which receive multimedia data streams or other data from the host servers 103-1, 1032 and re-direct the received data to a local display or other user interface.

Host servers 103-1, 103-2 may include server computers or any other computing devices capable of running one or more virtual machines 131-11-131-1N, 131-21-131-2N.

Each virtual machine 131 runs a guest operating system (OS) that may be different from one virtual machine to another. The guest OS may include Microsoft Windows, Linux, Solaris, Mac OS, etc. The host servers 103-1, 103-2 may include a respective hypervisor 132-1, 131-2 that emulates the underlying hardware platform for the virtual machines 131-11-131-1N, 131-21-131-2N. The hypervisor 132-1, 131-2 may also be known as a virtual machine monitor (VMM), a kernel-based hypervisor or a host operating system.

Each virtual machine 131-11-131-1N, 131-21-131-2N can be accessed by one or more of the clients 101-1, 101-N over the network 102 and can provide a virtual desktop for the client(s) 101-1, 101-N. From the user's point of view, the virtual desktop functions as a physical desktop (e.g., a personal computer) and is indistinguishable from a physical desktop. Each virtual machine 131-11-131-1N, 131-21-131-2N may be linked to one or more virtual disks. These virtual disks can be logical partitions of a physical disk managed by hypervisor 132-1, 132-2, can be cloud based storage devices, or can be some other type of virtual storage device. In one embodiment, virtual disks may form a whole or part of a logical data center. In one embodiment, virtual machines 131-11-131-1N, 131-21-131-2N and virtual disks, together with host servers 103-1, 103-2, may be collectively referred to as entities in a virtual machine system.

The virtual machines 131-11-131-1N, 131-21-131-2N and virtual disks are managed by the host controller 107. Host controller 107 may manage the allocation of resources from host server 103-1, 103-2 to virtual machines 131-11-131-1N, 131-21-131-2N. In addition, host controller may monitor the status of virtual machines 131-11-131-1N, 131-21-131-2N as well as the progress of commands and processes being executed by virtual machines 131-11-131-1N, 131-21-131-2N and/or on virtual machines 131-11-131-1N, 131-21-131-2N. In one embodiment, a request may be made by a user or application (e.g., through one of clients 101-1, 101-N) to perform some action. The request may be received by host controller 107, which generates a command in response to the request. For example, the request may be a request to start a new virtual machine 131-11-131-1N, 131-21-131-2N, stop a virtual machine 131-11-131-1N, 131-21-131-2N, create a virtual disk, or some other request.

The command generated by host controller 107 may include executable instructions to perform an action to satisfy the request. The command may be of a certain type and include certain parameters as specified in the request. In one embodiment, the command may be one of two types: a synchronous command or an asynchronous command. Synchronous commands terminate automatically when their execution has completed. Asynchronous commands, however, do not terminate until the action is completed by the event listener or by Asynchronous Task Manager 208 after detecting that the task logic is completed on the host, and thus, that the command can be completed.

In one embodiment, host controller creates a persisted Job entity ("job") to describe and monitor the command. The job may include a representation of the command (e.g., an entry in command status database 106) that is updated each time a meaningful portion of the command (referred to as a "step") is started and/or completed. For example, the command may call an action application programming interface (API) published by the job in order to update its status. In this manner, the command may update its own progress or status, without the need for a centralized task manager to actively monitor the progress of the commands or query the command for an update of the command's status. Once the command is completed, the job may be cleared from command status database 106. In one embodiment, command status database is stored on a data storage device 105 attached to host controller 107. The data storage device 105 may share the machine with the host controller 107 (e.g., a disk drive in the host controller computer) or be an independent device coupled to the host controller directly or via a network (e.g., as a network-attached storage device (NAS)).

Figure 2:
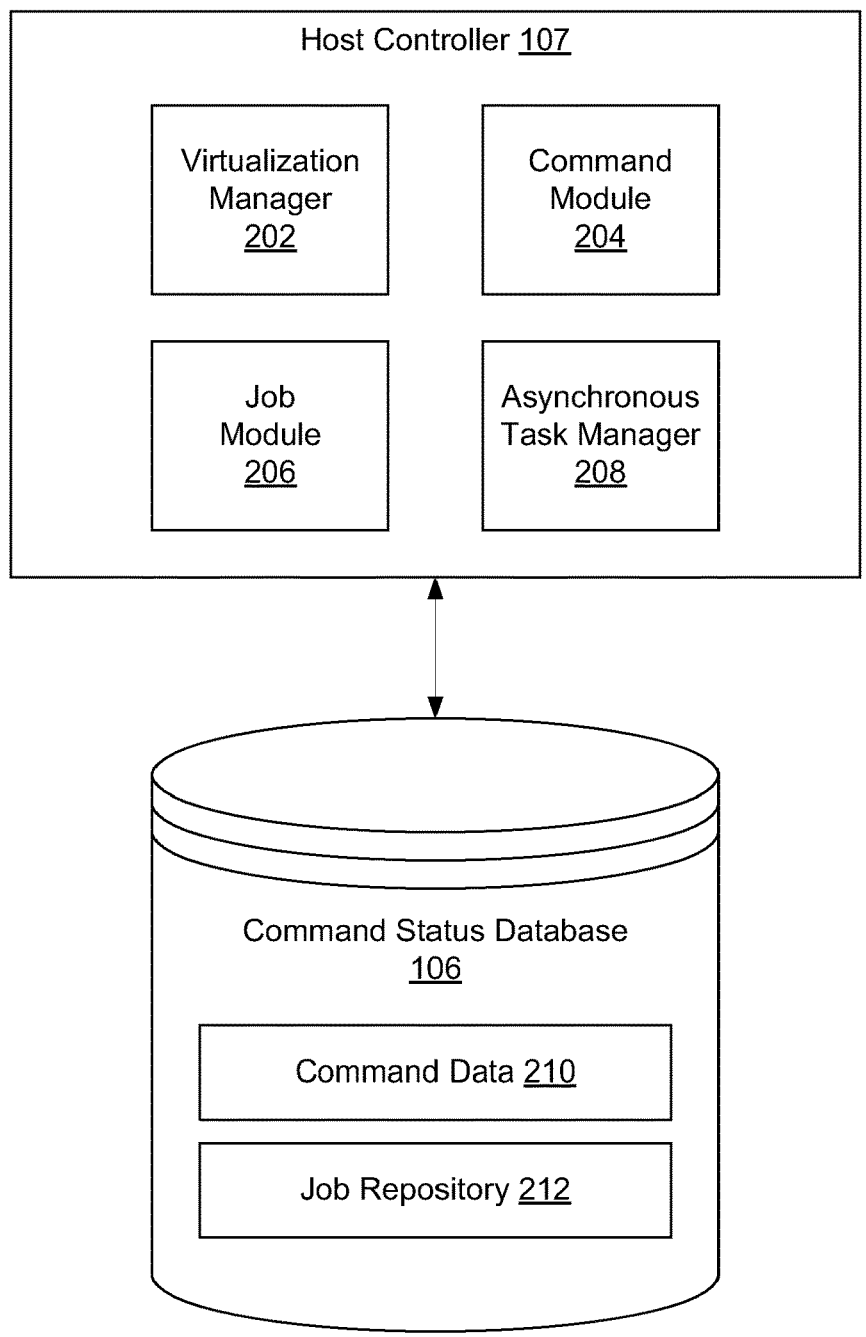
FIG. 2 is a block diagram illustrating a host controller for self-monitored commands, according to an embodiment.

FIG. 2 is a block diagram illustrating a host controller for self-monitored commands, according to an embodiment of the present invention. The host controller 107 may include virtualization manager 202, command module 204, job module 206 and asynchronous task manager 208. In one embodiment, host controller 107 is connected to command status database 106, which may be a file system, database or other data management layer resident on a data storage device, such as storage devices 105, and may include a disk drive, RAM, ROM, database, etc.

In one embodiment virtualization manager 202 receives and handles requests pertaining to host servers 103-1, 103-2 or virtual machines 131-11-131-1N, 131-21-131-2N. For example, a request may be received from a user or application (e.g., from client 101-1, 101-N) through network 102 at host controller 107. In another embodiment, the request may be a scheduled in host controller 107, and does not require user or client interaction. In another embodiment, the request may be automatically generated in response to the occurrence of an event in the system (e.g., if a host server 103-1-103-N is non-responsive). The requests may be received by virtualization manager 202. In one embodiment, virtualization manager 202 is a software backend running on host controller 107. The request may include an action type (e.g., start a virtual machine 131-11-131-1N, 131-21-131-2N), parameters and optionally a correlation identifier, which may be encapsulated in the parameters. The correlation identifier is a pass-through identifier of an action which the client 101-1, 101-N defines. The client 101-1, 101-N can associate any action with the correlation identifier, which may be used for action related logging in command status database 106. If the client does not provide a correlation identifier, virtualization manager 202 may generate one itself.

In response to receiving the request, virtualization manager 202 may issue a create command instruction to command module 204. In one embodiment, command module 204 creates an executable command in order to perform the action specified in the received request. In the example where the request was to start a virtual machine 101-11-131-1N, 131-21-131-2N, the command may include instructions to allocate resources of host server 103-1, 103-2 for virtual machine 131-11-131-1N, 131-21-131-2N. In one embodiment, command module 204 may retrieve the instructions to perform the action from command data 210 in command status database 106.

In addition, virtualization manager 202 may also issue a create job instruction to job module 206. In one embodiment, job module 206 creates a job that describes and monitors the execution of the command. The job may include a representation of the command (e.g., an entry in job repository 212) that is updated each time a meaningful portion of the command (referred to as a "step") is started and/or completed. For example, the command may call an action application programming interface (API) published by the job in order to update its status in job repository 212. For example the job in job repository 212 may expose an API for performing saveJob/updateJob and/or other job persistence actions. Thus, job repository 212 is the persistence mechanism for job and step entries. It is used for create, read, update and delete (CRUD) operations for jobs and steps. When a job is created, it is persisted to the job repository in order to reflect the immediate job status to the user. In one embodiment, job repository 212 may also maintain obsolete jobs in an archive.

Once both the command and the job associated with the command have been created, virtualization manager 202 may issue an execute command instruction to begin execution of the command. In one embodiment, the command may be a simple command including two steps: validation (CanDoAction) and execution. In this case, the job ends when the command associated with the job ends. In another embodiment, the command may include Virtual Desktop Server Management (VDSM) tasks and include three steps: validation (CanDoAction), execution and finalization (endAction). In this case, the job ends when the tasks are reported from VDSM as completed and the instruction endAction is invoked. In another embodiment, the command may invoke internal instructions. By default, these internal instructions may not be present as a step of the parent command. In another embodiment, the command may be a customized command including an asynchronous job where the termination is decided by an event other than the tasks. For example, commands which implement a IVdsAsyncCommand interface triggered by VDSBrokerFrontendImpl.RunAsyncVdsCommand, maintain the command instance with its context and are finalized by a third-party. In another example, the command execution is ended, but the resolution for the success of the action is determined by some other event in the system. In another embodiment, the command may be a multiple action runner that describes multiple commands invoked in a single API call. In this case, each command may be reflected as a single job.

In one embodiment, asynchronous task manager 208 is responsible for creating and polling tasks running on hosts, such as host servers 103-1, 103-2. When a job is created as an asynchronous job (i.e., a job with tasks on host server 103-1, 103-2), information about the tasks is kept by the job in job repository 212 (i.e., as the steps of the job). Upon completion of each task on the host, the corresponding steps of the job can be marked completed by asynchronous task manager 208 (e.g., success or failure). Asynchronous task manager 208 may poll the host periodically for task information, and based on the task status, determine how to handle the command.

Figure 3:
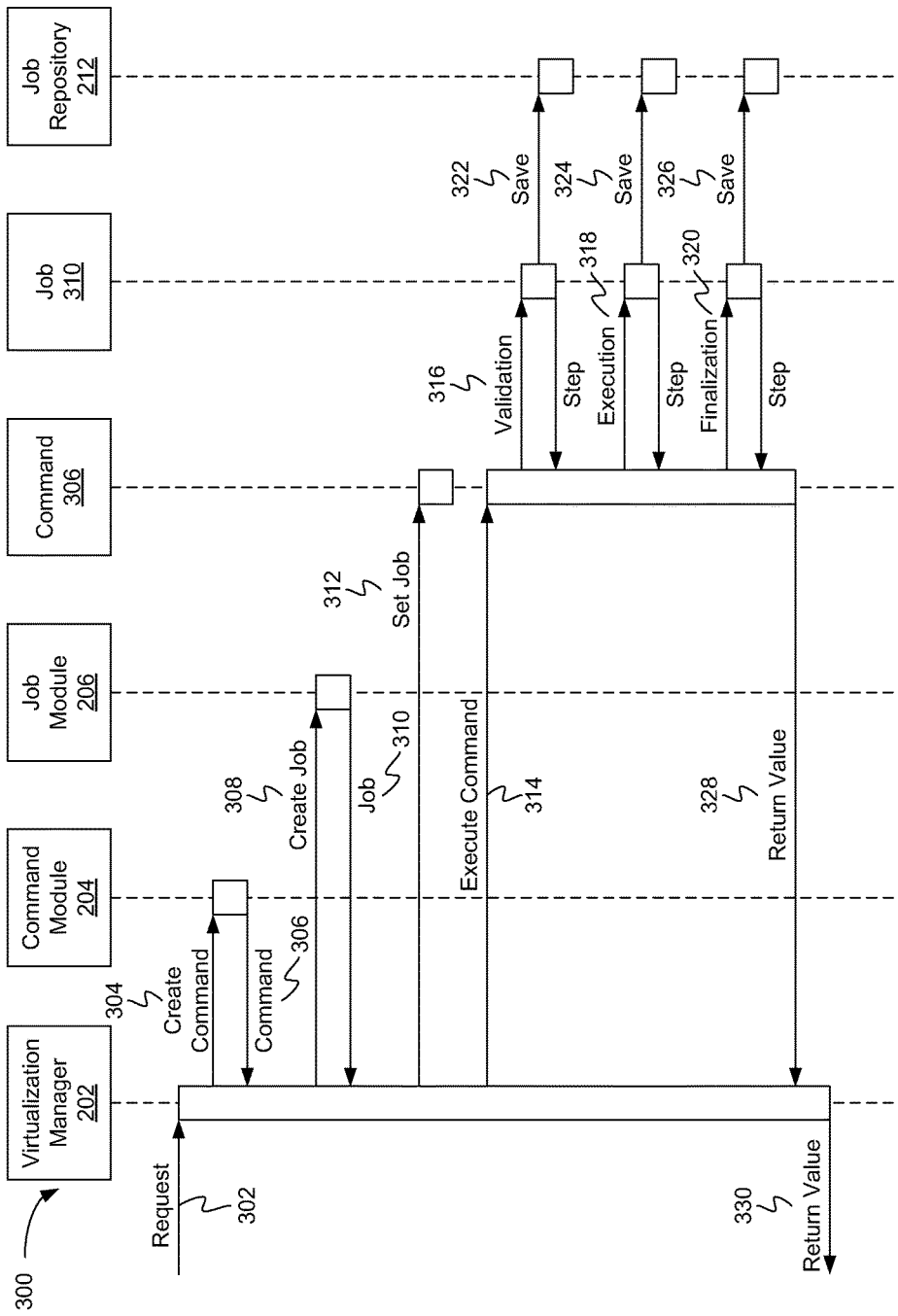
FIG. 3 is a block diagram illustrating a processing flow for self-monitored synchronous commands, according to an embodiment.

FIG. 3 is a block diagram illustrating a processing flow for self-monitored synchronous commands, according to an embodiment of the present invention. The various modules and components may be described in regards to their roles in how synchronous commands automatically self-report their status and/or progress without the need for an active process manager.

In one embodiment, the processing flow 300 begins with virtualization manager 202 receiving a request 302 pertaining to the virtual machine system (e.g., host servers 103-1, 103-2 or virtual machines 131-11-131-1N, 131-21-131-2N). For example, the request 302 may be received from a user or application (e.g., from client 101) through network 102 at host controller 107. In another embodiment, the request 302 may be scheduled in host controller 107, and does not require user or client interaction. In another embodiment, the request 302 may be automatically generated in response to the occurrence of an event in the system (e.g., if a host server 103 is non-responsive). The request 302 may include an action type (e.g., start a virtual machine 131-11-131-1N, 131-21-131-2N), parameters and optionally a correlation identifier, which may be encapsulated in the parameters.

In response to receiving the request, virtualization manager 202 may issue a create command instruction 304 to command module 204. In one embodiment, command module 204 creates an executable command 306 in order to perform the action specified in the received request 302. In the example where the request was to start a virtual machine 131-11-131-1N, 131-21-131-2N, the command 306 may include instructions to allocate resources of host server 103 for virtual machine 131-11-131-1N, 131-21-131-2N. In one embodiment, command module 204 may retrieve the instructions to perform the action from command data 210 in command status database 106.

In addition, virtualization manager 202 may also issue a create job instruction 308 to job module 206. In one embodiment, job module 206 creates a job 310 that describes and monitors the execution of the command 306. The job 310 may include a representation of the command (e.g., an entry in job repository 212) that is updated each time a meaningful portion of the command 306 (referred to as a "step") is started and/or completed. For example, the command 306 may call an action application programming interface (API) published by the job 310 in order to update its status in job repository 212.

Once both the command and the job associated with the command have been created, virtualization manager 202 may issue a set job instruction 312 and an execute command instruction 314 to begin execution of the command 306. The job set instruction 312 may associate the command 306 to be executed with the job 310 that monitors the execution of command 306. In one embodiment, the command 306 has three steps: validation 316, execution 318 and finalization 320. In other embodiments, the finalization 320 step may be optionally omitted, leaving a two step command. The execute command instruction 314 causes the command 306 to create the validation step 316 with a status of "started." In one embodiment, the validation step 316 verifies that the parameters provided to the command 306 are correct and that the virtualization manager 202 is capable of executing the command 306 using the given parameters. For example, when updating an IP address of the host network interface card, the IP address provided by the user is validated to ensure that it has the correct format. Command 306 determines how the validation step 316 ends. If the validation 316 failed, the job 310 associated with command 306 saves 322 the status of validation 316 (e.g., marks it as failed), along with the time the validation step 316 was completed, to job repository 212. If the validation 316 is successful, the job 310 saves 322 the status of validation 316 (e.g., marks it as finished).

The execute command instruction 314 causes the command 306 to create the execution step 318 with a status of "started." The execution step performs the action associated with the command 306 (e.g., starting a virtual machine). Command 306 determines how the execution step 318 ends. If the execution 318 failed, the job 310 associated with command 306 saves 324 the status of execution 318 (e.g., marks it as failed), along with the time the execution step 318 was completed, to job repository 212. If the execution 318 is successful, the job 310 verifies that there are no additional tasks associated with the command saves 324 the status of execution 318 (e.g., marks it as finished) to the job repository 212. When the finalization step 320 is executed, the command 306 performs a set of actions to finalize its flow. Upon a failure, the command 306 will usually release resources allocated by the command during the execution step 310. Job 310 saves 326 the result of the finalization set 320 to job repository 212.

Upon completion of all of the steps of the command 306, command 306 will return a value 328 to virtualization manager 202 indicating that the command 306 was successfully completed. If command 306 was unable to be completed (e.g., there were insufficient resources), the value 328 will indicate the failure. Virtualization manager 202 can forward the value 330 indicating the result of the command to the requestor.

Figure 4:
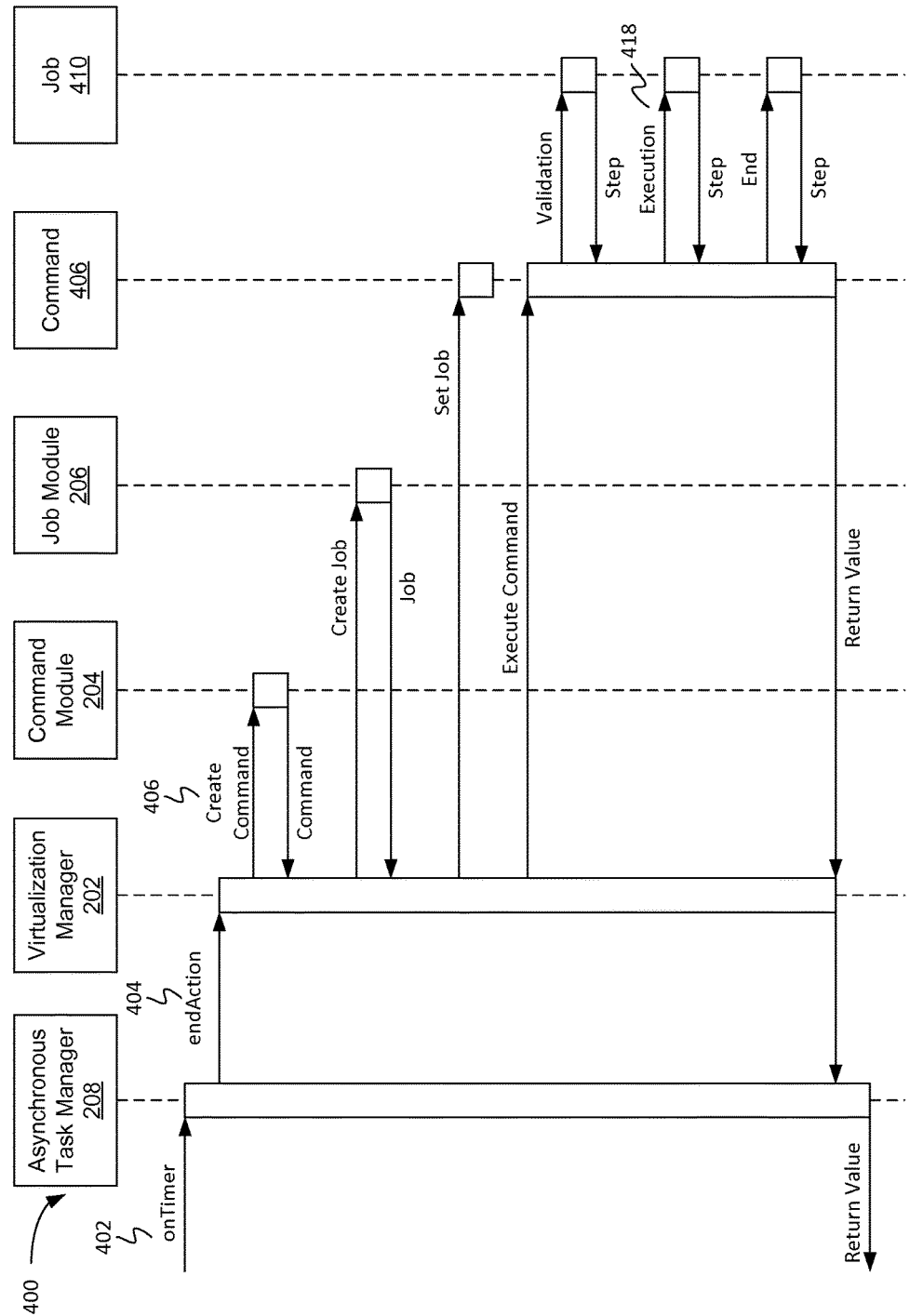
FIG. 4 is a block diagram illustrating a processing flow for self-monitored asynchronous commands, according to an embodiment.

FIG. 4 is a block diagram illustrating a processing flow for self-monitored asynchronous commands, according to an embodiment. The various modules and components may be described in regards to their roles in how asynchronous commands automatically self-report their status and/or progress without the need for an active process manager.

In one embodiment, the processing flow 400 begins as a result of a call to endAction 404, which is invoked asynchronously (as a result of the asynchronous on Timer method 402). Like synchronous command 306, asynchronous command 406 has an execution step 418. However, during the execution step 418 of asynchronous command 406, command 406 creates a task(s) that will run on the host, such as host server 103. During the asynchronous invocation sequence, asynchronous task manager 208 periodically polls the task statuses that are run on the host, and upon completion of the tasks, the asynchronous task manager 208 finalizes the command flow as explained above. This may occur after the execution step 418 of the command 406 has ended. This is in contrast to the synchronous invocation where the command flow ends upon the command execution.

Figure 5:
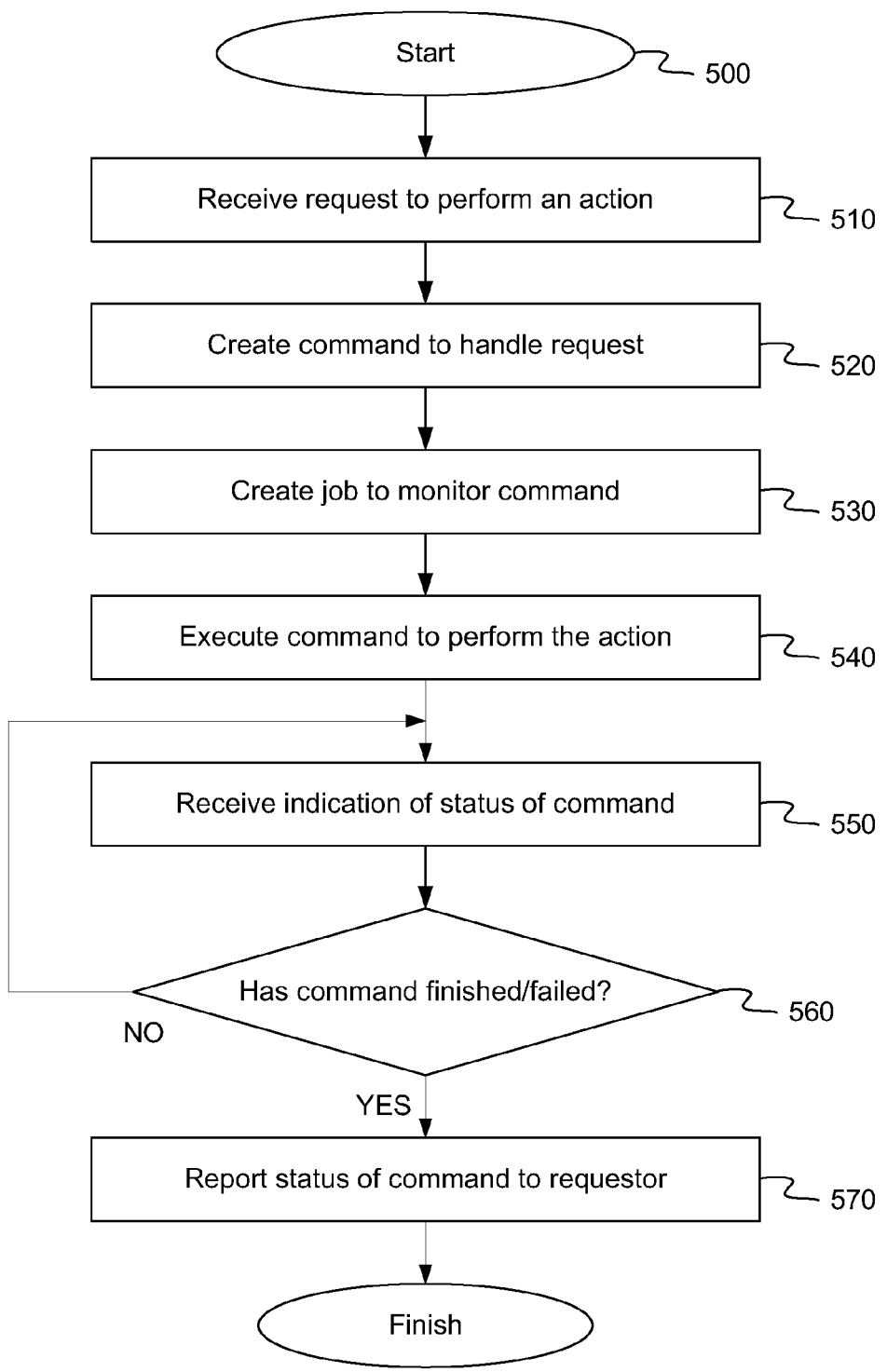
FIG. 5 is a flow diagram illustrating a method for self-monitored commands, according to an embodiment.

FIG. 5 is a flow diagram illustrating one embodiment of a method 500 for self-reporting commands in a virtualization environment. The method 500 may be performed by processing logic that may comprise hardware (e.g., circuitry, dedicated logic, programmable logic, microcode, etc.), software (e.g., instructions run on a processing device to perform hardware simulation), or a combination thereof. The method 500 allows commands to self-report their status and/or progress without the need for an active process manager In one embodiment, the method 500 is performed by a host controller (e.g., host controller 107 of FIGS. 1 and 2).

Referring to FIG. 5, at block 510, method 500 receives a request to perform an action. For example, a request may be received from a user or application (e.g., from client 101-1, 101-N) through network 102 at host controller 107. In another embodiment, the request may be scheduled in host controller 107, and does not require user or client interaction. In another embodiment, the request may be automatically generated in response to the occurrence of an event in the system (e.g., if a host server 103-1, 103-2 is non-responsive). The requests may be received by virtualization manager 202. The request may include an action type (e.g., start a virtual machine 131-11-131-1N, 131-21-131-2N), parameters and optionally a correlation identifier, which may be encapsulated in the parameters. The correlation identifier is a pass-through identifier of an action which the client 101-1, 101-N defines. The client 101-1, 101-N can associate any action with the correlation identifier, which may be used for action related logging in command status database 106. If the client does not provide a correlation identifier, virtualization manager 202 may generate one itself.

At block 520, method 500 creates a command to handle the request received at block 510. In one embodiment, virtualization manager 202 may issue a create command instruction to command module 204. In one embodiment, command module 204 creates an executable command in order to perform the action specified in the received request. In the example where the request was to start a virtual machine 131-11-131-1N, 131-21-131-2N, the command may include instructions to allocate resources of host server 103-1, 103-2 for virtual machine 101. In one embodiment, command module 204 may retrieve the instructions to perform the action from command data 210 in command status database 106.

At block 530, method 500 creates a job to monitor the command created at block 520. Virtualization manager 202 may also issue a create job instruction to job module 206. In one embodiment, job module 206 creates a job that describes and monitors the execution of the command. The job may include a representation of the command (e.g., an entry in job repository 212) that is updated each time a meaningful portion of the command (referred to as a "step") is started and/or completed.

At block 540, method 500 executes the command created at block 520 to perform the action. In one embodiment, once both the command and the job associated with the command have been created, virtualization manager 202 may issue an execute command instruction 314 to begin execution of the command 306. In one embodiment, the command 306 has three steps: validation 316, execution 318 and finalization 320. In other embodiments, the finalization 320 step may be optionally omitted, leaving a two step command.

At block 550, method 500 receives an indication of the status of the command. In one embodiment, at the start and/or completion of each step in the command, the command reports its status. For example, the command may call an action application programming interface (API) published by the job in order to update its status. In one embodiment, the status may be stored in an entry associated with the command in job repository 212.

At block 560, method 500 determines whether the command has completed execution or failed to complete. In one embodiment, the command fails if any of the steps return a value to job repository 212 indicating a failure of that particular step. Similarly, a command completes execution if each step returns a value indicating "finished," as well as the finalization step being completed, if included in the command. The command is deemed not to have either finished or failed if there are still remaining tasks and/or steps associated with the command to be performed. If the command has not finished and/or failed (i.e., there are remaining steps to be executed), method 500 returns to block 550 and continues to received indications of the status of the command. If the command has finished and/or failed, method 500 continues at block 570.

At block 570, method 500 reports the status of the command to the requestor. Upon completion of all of the steps of the command 306, command 306 will return a value 328 to virtualization manager 202 indicating that the command 306 was successfully completed. If command 306 was unable to be completed (e.g., there were insufficient resources), or otherwise failed, the value 328 will indicate the failure. Virtualization manager 202 can forward the value 330 indicating the result of the command to the requestor.

Figure 6:
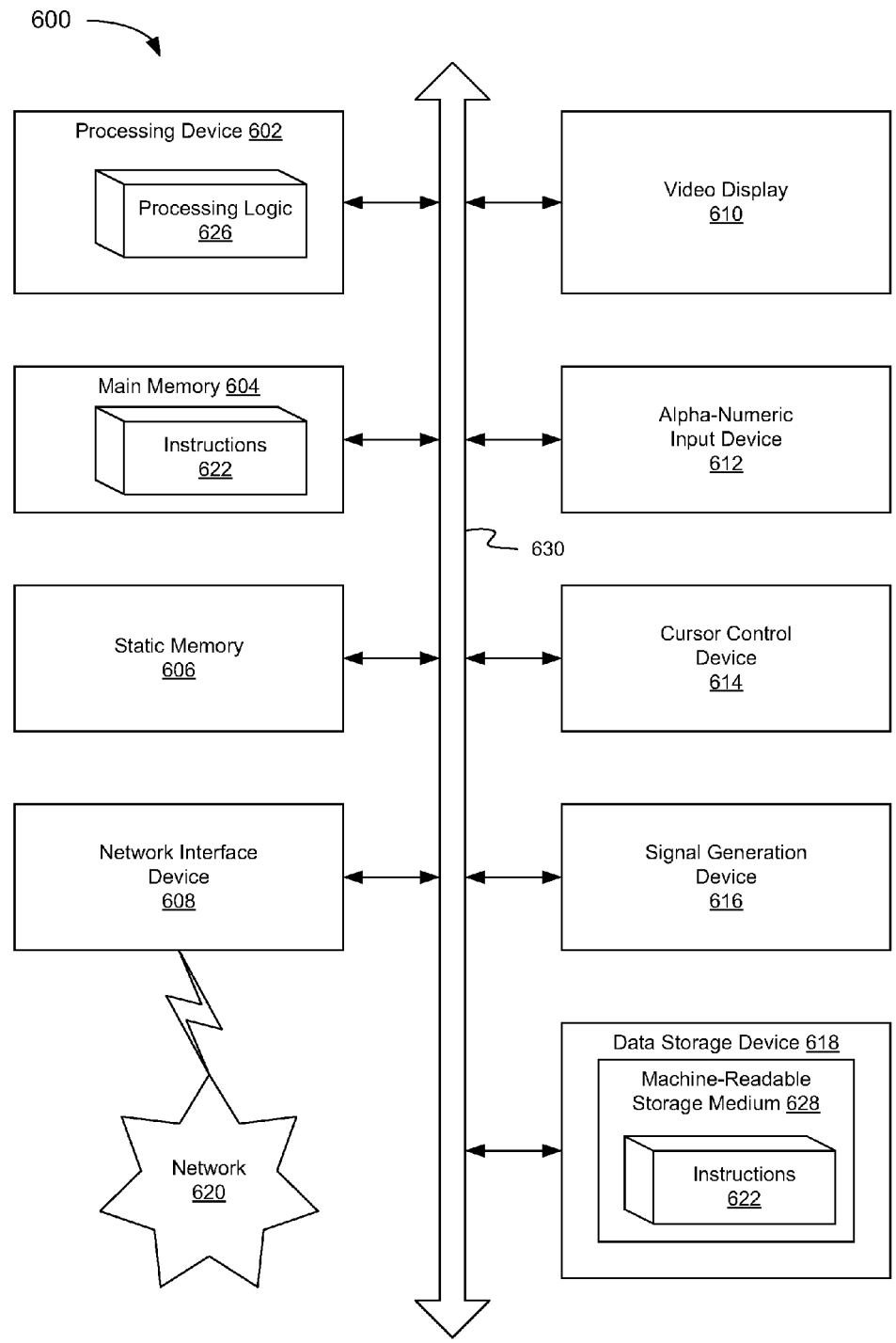
FIG. 6 is a block diagram illustrating a computer system, according to an embodiment.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a computing device, such as client 101, host server 103 or host controller 107 used in a system 100 for self-monitored commands.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 628, on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-accessible storage media. The instructions 622 may further be transmitted or received over a network 620 via the network interface device 608.

The machine-readable storage medium 628 may also be used to store instructions for self-monitored commands, as described herein. While the machine-readable storage medium 628 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method comprising:
   receiving, by a processing device of a host machine of a virtual computing system, a request to perform an action in the virtual computing system, the request comprising parameters for the action;
   responsive to receiving the request, generating a command and a monitoring job associated with the command, the command to cause execution of:
     a validation process to validate a capability of the processing device to execute a plurality of operations for the action in view of the parameters,
     an execution process to execute the plurality of operations for the action, and
     a reporting process to report a status of the execution of the validation process and the execution process independent of a centralized task managing process,
   wherein the monitoring job is to monitor, independent of a centralized task managing process, a progress of execution of the command comprising execution of the plurality of operations in the execution process,
   wherein generating the monitoring job comprises creating an entry in a command status database to store the progress of execution of the command comprising the execution of the plurality of operations in the execution process;
   after generating the command and prior to executing the command, initiating the monitoring job associated with the command to expose an application programming interface (API) of the monitoring job to record the status of the execution of the validation process and the execution process;
   executing the command, wherein executing the command comprises:
     reporting, to the exposed API of the monitoring job, a notification to cause an update of the entry representing the command each time execution of the validation process and the execution process comprising the plurality of operations is completed, wherein the reporting is in accordance with the command and independent of the centralized task managing process; and responsive to completing the execution of the command:
  terminating execution of the monitoring job; and
  clearing, from the command status database, the entry that stores the progress of the execution of the command.

2. The method of claim 1, wherein the command calls the API each time one of the plurality of operations is completed to report the progress of the execution of the command.

3. The method of claim 2, wherein the command calls the API each time one of the plurality of operations is started to report the progress of the execution of the command.

4. The method of claim 1, wherein the command is a synchronous command that terminates when execution of all operations associated with the command is completed.

5. The method of claim 1, wherein the command is an asynchronous command that is terminated by an asynchronous task manager responsive to detecting one of the plurality of operations associated with the command is completed.

6. The method of claim 1, wherein the virtual computing system does not include a centralized task process manager to concurrently monitor more than one action.

7. A system comprising:
  a memory; and
  a processing device, operatively coupled to the memory, to execute a virtual computing system, the processing device to:
  receive a request to perform an action in the virtual computing system, the request comprising parameters for the action;
  responsive to receiving the request, generate a command comprising and a monitoring job associated with the command, the command to cause execution of:
    a validation process to validate a capability of the processing device to execute a plurality of operations for the action in view of the parameters,
    an execution process to execute the plurality of operations for the action, and
    a reporting process to start a status of the execution of the validation process and the execution process independent of a centralized task managing process,
    wherein the monitoring job is to monitor, independent of a centralized task managing process, a progress of execution of the command comprising execution of the plurality of operations in the execution process,
    wherein generating the monitoring job comprises creating an entry in a command status database to store the progress of execution of the command comprising the execution of the plurality of operations in the execution process;
  after generating the command and prior to executing the command, initiate the monitoring job associated with the command to expose an application programming interface (API) of the monitoring job to record the status of the execution of the validation process and the execution process;
  execute the command, wherein to execute the command, the processing device is to:
    report, to the exposed API of the monitoring job, a notification to cause an update of the entry representing the command each time execution of the validation process and the execution process comprising the plurality of operations is completed, wherein the reporting is in accordance with the command and independent of the centralized task managing process; and
  responsive to completing the execution of the command:
    terminate execution of the monitoring job; and
    clear, from the command status database, the entry that stores the progress of the execution of the command.

8. The system of claim 7, wherein the command calls the API each time one of the plurality of operations is completed to report the progress of the execution of the command.

9. The system of claim 8, wherein the command is to call the API each time one of the plurality of operations is started to report the progress of the execution of the command.

10. The system of claim 7, wherein the command is a synchronous command that terminates when execution of all operations associated with the command is completed.

11. The system of claim 7, wherein the command is an asynchronous command that that is terminated by an asynchronous task manager responsive to detecting one of the plurality of operations associated with the command is completed.

12. The system of claim 7, wherein the virtual computing system does not include a centralized task process manager to concurrently monitor more than one action.

13. A non-transitory machine-readable storage medium storing instructions which, when executed, cause a processing device to:
  receive, by the processing device of a host machine of a virtual computing system, a request to perform an action in the virtual computing system, the request comprising parameters for the action;
  responsive to receiving the request, generate a command comprising and a monitoring job associated with the command, the command to cause execution of:
    a validation process to validate a capability of the processing device to execute a plurality of operations for the action in view of the parameters,
    an execution process to execute the plurality of operations for the action, and
    a reporting process to report a status of the execution of the validation process and the execution process independent of a centralized task managing process,
    wherein the monitoring job is to monitor, independent of a centralized task managing process, a progress of execution of the command comprising execution of the plurality of operations in the execution process,
    wherein generating the monitoring job comprises creating an entry in a command status database to store the progress of execution of the command comprising the execution of the plurality of operations in the execution process;
  after generating the command and prior to executing the command, initiate the monitoring job associated with the command to expose an application programming interface (API) of the monitoring job to record the status of the execution of the validation process and the execution process;
  execute the command, wherein to execute the command, the processing device is to:
    report, to the exposed API of the monitoring job, a notification to cause an update of the entry representing the command each time execution of the validation process and the execution process comprising the plurality of operations is completed, wherein the reporting is in accordance with the command and independent of the centralized task managing process; and responsive to completing execution of the command:
terminate execution of the monitoring job; and
clear, from the command status database, the entry that stores the progress of the execution of the command.

14. The non-transitory machine-readable storage medium of claim 13, wherein the command calls the API each time one of the plurality of operations is completed to report the progress of the execution of the command.

15. The non-transitory machine-readable storage medium of claim 14, wherein the command calls the API each time one of the plurality of operations is started to report the progress of the execution of the command.

16. The non-transitory machine-readable storage medium of claim 13, wherein the command is a synchronous command that terminates when execution of all operations associated with the command is completed.

17. The non-transitory machine-readable storage medium of claim 13, wherein the command is an asynchronous command that is terminated by an asynchronous task manager responsive to detecting one of the plurality of operations associated with the command is completed.

18. The non-transitory machine-readable storage medium of claim 13, wherein the virtual computing system does not include a centralized task process manager to concurrently monitor more than one action.

* * * * *